United States Patent [19]

Schwend

[11] 3,739,679
[45] June 19, 1973

[54] CHAMFERING SAW

[75] Inventor: Francis R. Schwend, Thousand Oaks, Calif.

[73] Assignee: Northrop Corporation, Los Angeles, Calif.

[22] Filed: Oct. 4, 1971

[21] Appl. No.: 185,937

[52] U.S. Cl. .................... 83/789, 83/811, 83/565
[51] Int. Cl. .................... B23d 53/08, B27b 13/04
[58] Field of Search ............... 143/20, 26 R, 17 A, 143/47 F; 83/201 R, 201.07, 565, 201.15, 201.04, 789, 811, 565; 144/144 R, 124

[56] References Cited
UNITED STATES PATENTS

| | | |
|---|---|---|
| 2,871,896 | 2/1959 | Markwell .......................... 143/47 F |
| 2,805,692 | 9/1957 | Thompson ....................... 144/144 R |
| 3,541,922 | 11/1970 | Dunlap ............................ 144/144 R |
| 3,587,378 | 6/1971 | Oppenhein ........................ 83/565 X |

Primary Examiner—Donald R. Schran
Attorney—William W. Rundle et al.

[57] ABSTRACT

A profile chamfering saw facility usable in chamfering the edges of honeycomb filler material for sandwich structures, reinforced panels and the like. The facility includes an elongated work support surface and provides means for mounting an inclined band saw for lateral and longitudinal movement with respect to the support surface along a template edge directing the band saw with respect to the filler material enabling its edges to be chamfered. Chamfer angle is adjustable by tilting the band saw in a vertical plane.

4 Claims, 4 Drawing Figures

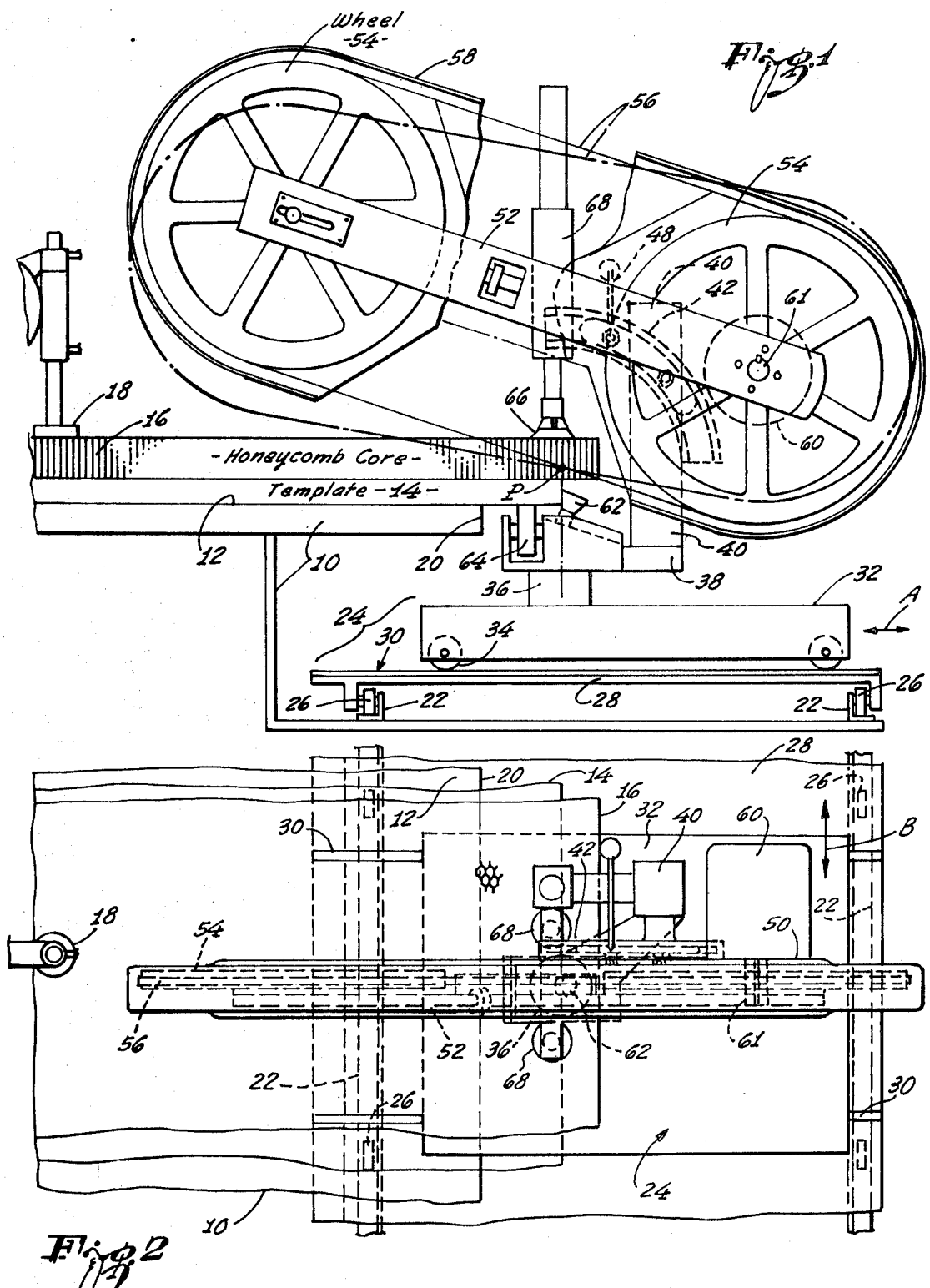

CHAMFERING SAW

The present invention relates to tooling for manufacturing processes, and more particularly, to a travelling saw for putting a chamfer or bevel on the circumferential edge of manufactured panel-like members or on certain constituents thereof.

In the manufacture of aircraft panels, doors, and the like, for example, modern designs use a suitable outer surface or skin backed up by a reinforcement of lightweight core material such as honeycomb of various dimensions. These skins are frequently chemmilled or the inside surface profile milled by other means, and the honeycomb which is attached thereto preferably has the outer edges chamfered from its normal thickness down to a thin edge. Due to the irregularity of the perimeter of such panels or other pieces, the final beveled edge of the stiffening backing or core takes on a complex shape.

Since the forming of the chamfers would be impractical to accomplish after such core or filler material is secured to the final surface component, it is an object of this invention to provide a means and method of producing a chamfered edge on the separate piece or pieces of filler material, especially the hard-to-machine honeycomb core type.

Another object of the present invention is to provide maneuverable cutting means and means for guiding the same in required relation to the honeycomb periphery to produce the desired final shape of the peripheral chamfer.

Briefly, my invention comprises a table-like support for the material to be chamfered, a flat template having the required outer edge shape of the finished chamfered material, and a movable saw assembly mounted for various directions of movement along a track extending along one side of the support table. The saw assembly includes template following means, work support means, and means for adjusting and moving the saw in a plurality of directions for producing the proper chamfering cuts.

Other objects and advantages of the invention will be noted in the detailed description of a specific apparatus to follow, and the invention will be more fully understood by reference to this description and to the accompanying illustrative drawings.

In the drawings:

FIG. 1 is a left hand side elevation view of the chamfering facility.

FIG. 2 is a partial plan view of FIG. 1.

Figure 3:
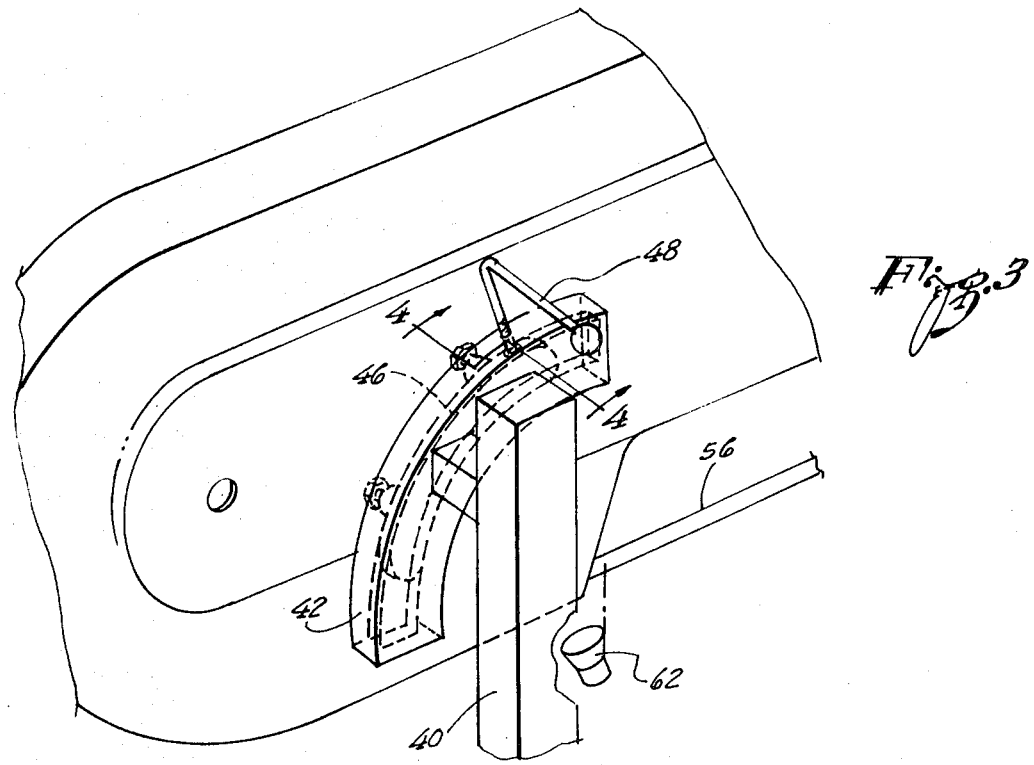
FIG. 3 is a partial perspective view of the right hand side of the facility.

Referring first to FIGS. 1 and 2, a work support table 10 has an upper surface 12 on which is placed a template 14 having the required peripheral shape of a honeycomb-section member 16 to be edge-chamfered. Honeycomb section 16 is attached temporarily to the top of the template 14 with double-sided adhesive tape, for example (not shown). Template 14 and attached honeycomb work can be positioned on the table 10 as desired and then held along points near a rear edge by a plurality of air-actuated hold down pads 18 mounted on the back of the table 10. The template 14 overhangs the front edge 20 of table 10 as shown.

On a lower level and along table front edge 20, the table 10 also includes a track comprising two longitudinal angle-irons 22, for example, along which operates a movable saw assembly 24 on angle-guided rollers 26. The rollers 26 are mounted on a longitudinal carrier 28 having lateral rails 30 along which is mounted a platform 32 on cross rollers 34. Rails 30 and rollers 34 are shown in simplified form. The assembly 24 is thus movable in two perpendicular directions A and B in the horizontal plane.

Figure 4:
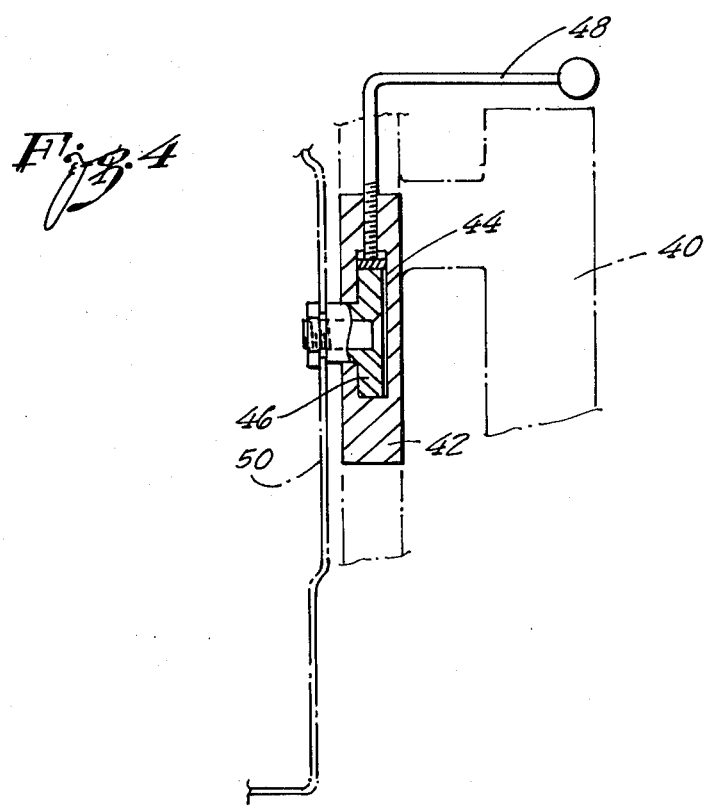
FIG. 4 is a detail viewed as indicated by the line 4—4 in FIG. 3, showing adjustment details for changing chamfer angle.

From the top of platform 32 rises a cylindrical shaft 36 on a saw pedestal 38. The pedestal 38 is rotatable about the vertical axis of shaft 36. Pedestal 38 includes a vertical support post 40 located on the opposite side of shaft 36 from the table 10, and a quadrant 42 is solidly fixed to this post 40, as further shown in FIG. 3. As shown in FIG. 4, quadrant 42 contains an arcuate T-slot 44 therein, extending in a vertical plane. Riding within T-slot 44 is a curved T-bar 46 which can slide to any position therein, within the dimensional range of the parts, and be clamped tightly at any one of these positions by a clamp and operating handle 48 therefor in any convenient manner.

The T-bar 46 is rigidly fixed to a saw housing 50, open on the left side, containing support structure 52 (FIGS. 1 and 2) for a pair of band saw wheels 54 around which is fitted a band saw blade 56. A left side housing cover 58, partially shown in FIG. 1, is preferably provided. An air-powered motor 60, for example, is connected to housing 50, and a motor drive shaft 61 is drivingly connected oto one of the saw wheels 54.

Working in a critical manner with saw blade 56 is a bevel headed guide roller 62 installed at an inclined angle on the pedestal 38 directly above the vertical shaft 36. The forward beveled face of this guide roller 62, i.e., the face nearest the template 14, lies along a vertical line coincident with the rotational axis of the shaft 36, so that the guide roller 62 will act as a template follower. The saw blade 56 passes directly above guide roller 62, and the center of the arc of quadrant 42 lies on the same shaft axis at a point P just above the guide roller 62. Thus, the saw blade 56 pivots about point P when the saw housing 50 is tilted to various angles in the vertical plane by means of the T-bar 46 and quadrant 42.

The flat head of guide roller 62 makes an angle of 30°, for example, with the horizontal, as viewed in FIG. 1. The band saw adjustment through quadrant 42 is provided to be from 3° to 30° to the horizontal, for example.

The chamfering operation will now be evident as shown in FIG. 1. When running, with the guide roller 62 contacting and travelling along the edge of the template 14, the saw will cut off the work material 16 to form the desired edge chamfer. Since the saw blade 56 can be pivoted in a vertical plane about point P as described, the blade height is always automatically taken care of regardless of the set chamfer angle of anywhere from 3° to 30°.

To further support the work pieces where the cutting is actually being done, a pair of spaced support rollers 64 (FIG. 1) is preferably mounted on the pedestal 38 to contact and roll along the lower surface of template 14 in a longitudinal direction on closely adjacent opposite sides of the guide roller 62. In cooperation with support rollers 64, a pair of auxiliary top pressure pads 66 may also be provided. These auxiliary pads 66 press down on the upper side of the honeycomb 16 or other material being cut, in similar spaced positions as the support rollers 64, with the pressure being regulated in air cylinders 68 carried on the post 40 to maintain the stability of the top portion of honeycomb 16 as it is being cut from the remaining portion. The longitudinal movement of the saw assembly 24 is normally imparted manually, keeping the guide roller 62 pressed against the template 14, which may of course curve outwardly or inwardly as the shape of the finished part dictates.

After one longitudinal pass along the template 14 and attached work, the work piece and template 14 are then turned as a unit and repositioned for another cut under the band saw, and so on until the entire chamfer is completed. The core section 16 (or honeycomb reinforcement as the case may be) is then of course removed from the template 14 for subsequent attachment to its surface panel for example.

It is obvious that many variations and modifications could be made to the specific embodiment of saw device disclosed herein. The hold-down pads 18 could be under mechanical linkage force, for instance. The number and location of various rollers 26, 34, and 64 could be changed. A separate pure up-and-down adjustment for the band saw housing 50 could be added. A lock can be provided to hold the saw from rotating on the vertical shaft 36, although the rotation is preferred when the template has curves, in order to keep the saw blade 56 normal to the template edge as viewed in the plan view.

Thus it is seen that an efficient, practical and easily operable facility has been provided to fulfill the objectives of this invention, which facility can be applied to chamfering work usable in many applications.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. A profile chamfering facility comprising:
   a. a support surface for the material to be chamfered;
   b. means for holding the material to be chamfered on said support surface;
   c. a band saw assembly comprising a band saw and a pedestal on which said saw is mounted, said saw being tilted to position its cutting blade to the desired chamfer angle relative to said material;
   d. track means on which said saw assembly is movable along an edge of said material; and
   e. said pedestal being pivotally mounted about a vertical axis relative to said track means.

2. Apparatus in accordance with claim 1 including a platform on which said pedestal is mounted, said platform being movable on said track means both parallel to said edge of said material and perpendicular thereto in the same plane as said support surface.

3. Apparatus in accordance with claim 1 including
   a. a template having an edge shape corresponding to the outer edge shape of the material after chamfering, together with means holding said template stationary with respect to said material; and
   b. a guide roller mounted on said pedestal in position to follow and roll along the edge of said template;
   c. the point of contact of said roller and template being aligned with said vertical axis.

4. Apparatus in accordance with claim 1 including adjustable means for varying the angle of tilt of said band saw relative to said pedestal, whereby said chamfer angle is variable.

* * * * *